April 7, 1953 U. A. MOORES 2,633,701
ROTARY RAM JET PROPELLED MOTOR
Filed May 28, 1951 6 Sheets-Sheet 1

Inventor
Urban A. Moores
By
Shoemaker & Mattare
Attorneys

April 7, 1953 U. A. MOORES 2,633,701
ROTARY RAM JET PROPELLED MOTOR
Filed May 28, 1951 6 Sheets-Sheet 5

Inventor
Urban A. Moores
By Shoemaker & Mattare
Attorneys

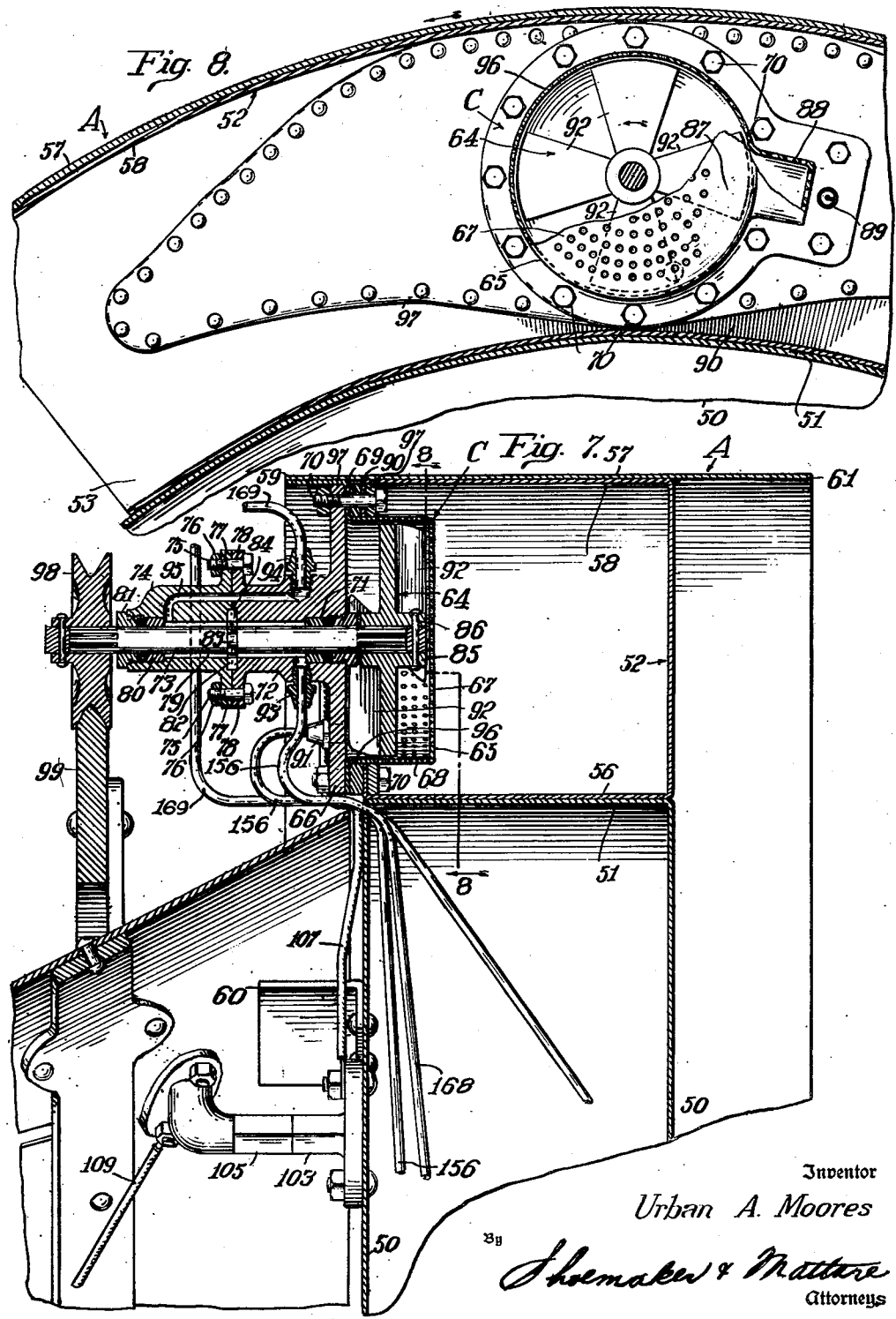

Patented Apr. 7, 1953

2,633,701

UNITED STATES PATENT OFFICE 2,633,701

ROTARY RAM JET PROPELLED MOTOR

Urban A. Moores, Rutland Heights, Mass.

Application May 28, 1951, Serial No. 228,609

23 Claims. (Cl. 60—35.6)

This invention relates to an improved rotary ram jet propelled motor.

An important object of the invention is to provide an improved rotary ram jet propelled motor that will operate efficiently as an airplane power plant and overcome the problem of high take-off speed thereby enabling the plane to travel at conventional passenger and freight carrying speeds, without loss of efficiency; that is adaptable for use as a power plant for helicopters and also as a conventional prime mover for a stationary power plant.

An important novel characteristic of the invention resides in a rotary ram jet propelled motor comprising a rotor having a plurality of generally arcuate shaped tubular members extending about peripheral portions thereof substantially concentric with the axis of rotation of the rotor and into one end of each of which tubular members air is forced by rotation of the rotor, fuel being mingled with the air in the tubular members, and the mixture ignited, the resulting highly compressed gases within the tubular members issuing from the other exhaust ends thereof in the form of high velocity jets that exert a propulsive force upon the rotor.

Another important novel feature of the invention lies in a rotary ram jet propelled motor for airplane power plants comprising a rotor of the construction referred to having the partly circular tubular members about the periphery thereof and which have their exhaust end portions so disposed that the high velocity jets issuing therefrom are directed to cause rotation of the rotor and also at the same time produce a forward axial thrust.

Other important novel features of the invention are the special mounting for the rotor of the motor; the rotatable fuel atomizers and means for driving the same; and the particular lubricating system for the rotor bearings of the motor and the bearings of the rotatable atomizers.

The invention, with other objects, novel features and the advantages thereof, and the particular construction, combinations and arrangements of parts comprising the same, will be understood from the following detailed description when considered in connection with the accompanying drawings forming part hereof and illustrating one embodiment of the invention.

In the drawings:

Fig. 7 is a detail vertical section on the line 7—7 of Fig. 1;

Fig. 8 is a detail vertical section on the line 8—8 of Fig. 7 looking in the direction of the arrows;

Fig. 9 is a detail fragmentary section on the line 9—9 of Fig. 1;

Fig. 10 is a detail view of the split thrust ring;

Fig. 11 is a detail perspective view of the thrust yoke engaging the collar on the shaft transmitting power from the starting motor to the rotor.

Figure 1:
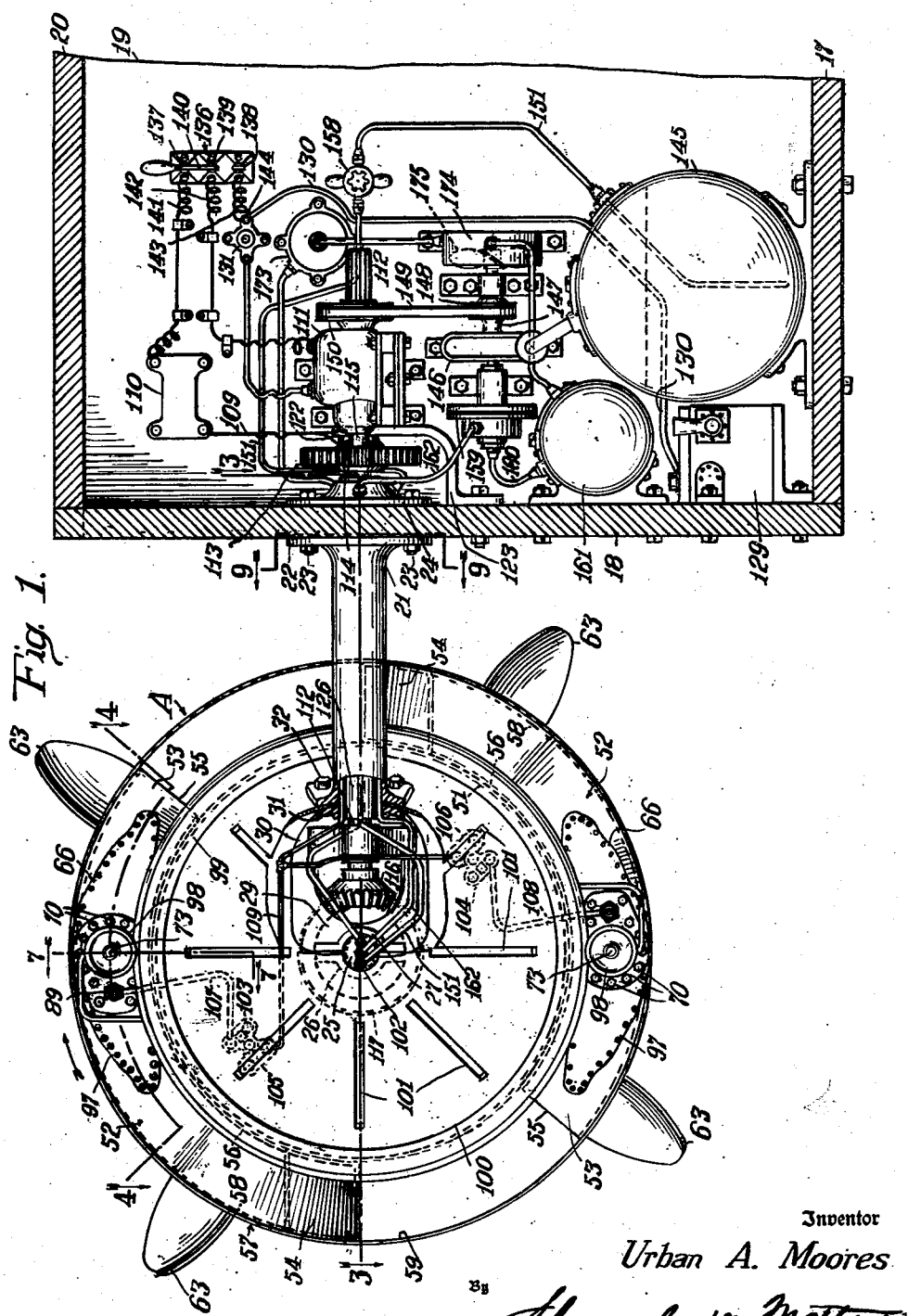
Fig. 1 is a front elevation of a rotary ram jet propelled motor and mounting therefor constructed in accordance with the present invention, the conical air deflector housing being shown broken away at its forward part.

While a preferred embodiment of the invention especially adapted for use as an airplane power plant is illustrated in the drawings, it will be understood that minor changes and modifications may be made in the particular construction shown to adapt the same for use as a conventional prime mover or stationary power plant, and the invention may be embodied in other forms as will appeal to those skilled in the art and falling within the scope of the appended claims without departing from the spirit of the invention.

Referring to a detailed description of the particular exemplification of the invention illustrated in the drawings, a rectangular supporting frame or housing is shown including a base plate 17, front and end walls or panels 18, 19 and a top plate 20, the supporting frame or housing being suitably mounted on the fusilage of an airplane (not shown). Extending forwardly horizontally from the front wall or panel 18 of the supporting frame is a main supporting member 21 for the turbine rotor generally designated A. This main supporting member, which is tubular, is firmly mounted at its inner end on the front wall or panel 18 of the supporting frame, said supporting member having an annular attaching flange 22 at its inner end secured by bolts 23 to the front wall 18, the bolts passing through the attaching flange 22, the front wall 18 of the supporting frame and a reinforcing collar 24 at the inner side of the front wall 18. Supported on the main supporting member 21 and extending at right angles thereto from the forward end thereof is a horizontal shaft 25 on which the rotor A of the motor is mounted for rotation, this shaft 25 being firmly connected at its inner end with the outer end portion of the main supporting member 21 by a clamp comprising members 26, 27 shaped to embrace the inner end portion of the shaft 25 and secured together by bolts 28. The member 27 of the clamp has a curved lateral extension 29 which terminates in a portion 30 having at its inner end a flange 31 that is disposed opposite to a flange on the outer end of the supporting member 21 and secured thereto by bolts 32.

The rotor A of the motor includes a hub 33 fitting over a bearing sleeve 34 on the outer part of the shaft 25 and provided at opposite ends with outwardly extending flanges 35 and 36. The hub 33 is held on the shaft 25 by a split thrust ring 37 rotatably fitting in an annular groove 38 in the outer end portion of the shaft 25, and the outer portion of said thrust ring 37 fitting in an annular recess 39 in the inner side of a cap member 40, the latter having an annular attaching flange 41 fitting against and secured to the flange 36 of the hub 33 by bolts 42 and nuts 43, this construction constituting simple, efficient means for retaining the hub 33 in position on the shaft 25 without the use of an outside thrust bearing and providing for easy assembly of the parts. At the other end of the hub 33 is an annular head 44 rotatably fitting on the shaft 25, said head fitting against the adjacent end of the hub 33 and having a flange 45 secured to the flange 35 of the hub 33 by bolts 46. The end head member 44 as shown has a laterally projecting shoulder portion 47 fitting in the end of the hub 33, and said end head member at its other end has an outwardly extending flange 48. A collar 49 is secured to the flange 36 of the hub 33 by the bolts 42. Centrally apertured side plates 50 are secured at central portions thereof to the collar 49 and the flange 35 at the inner end of the hub 33, and 51 is an inner rim member suitably secured to the peripheral portions of the side plates 50.

Figure 2:
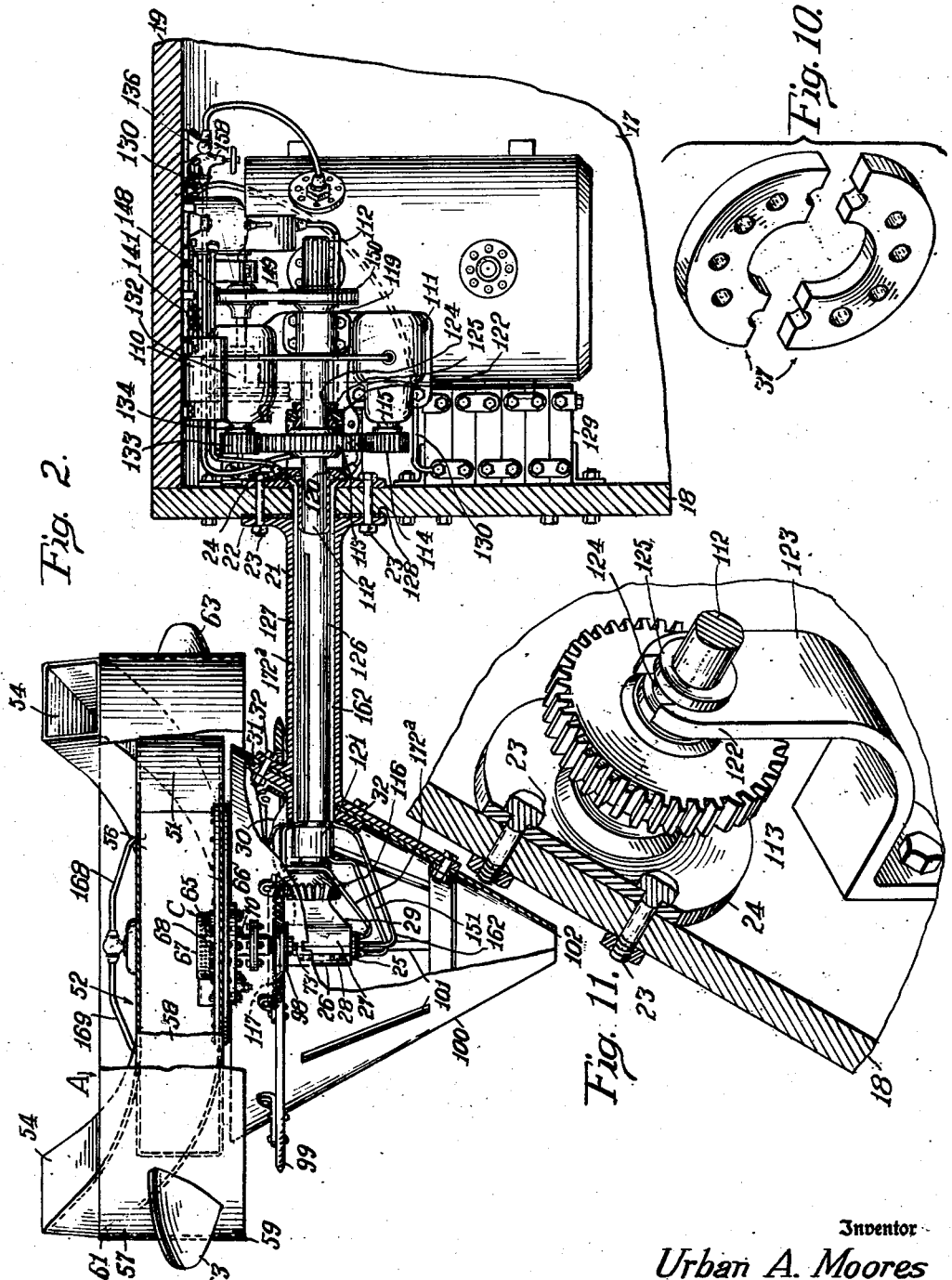
Fig. 2 is a top plan view with parts shown in section.
Figure 5:
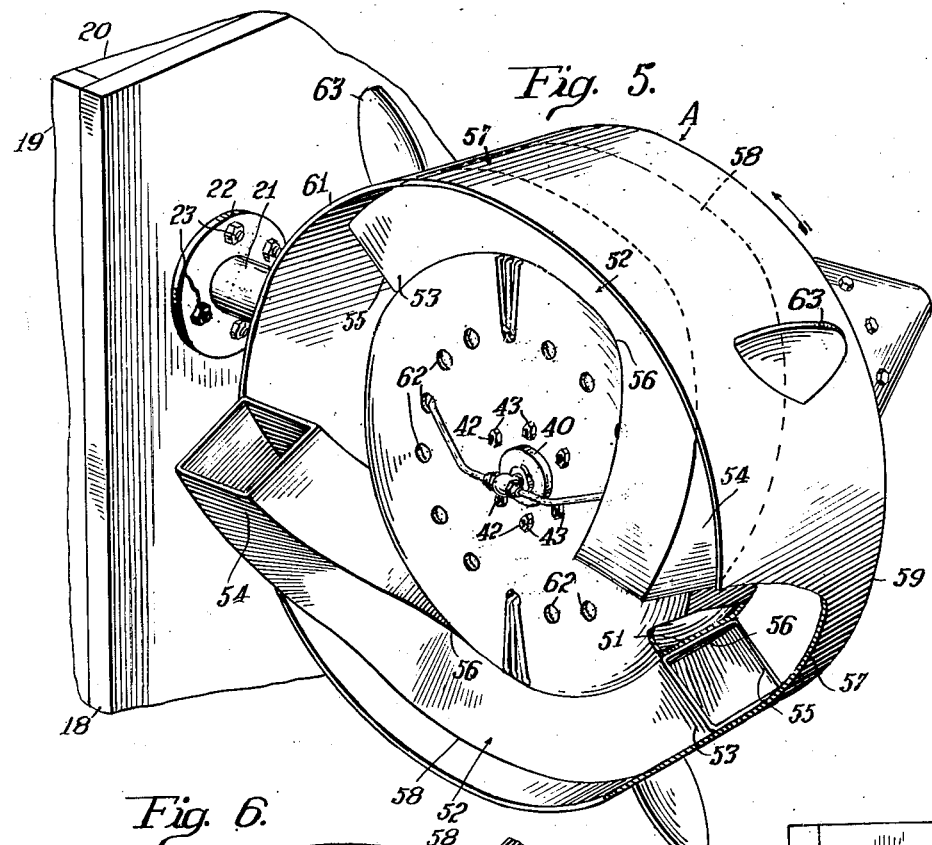
Fig. 5 is a perspective view taken from the rear side of the rotor.
Figure 6:
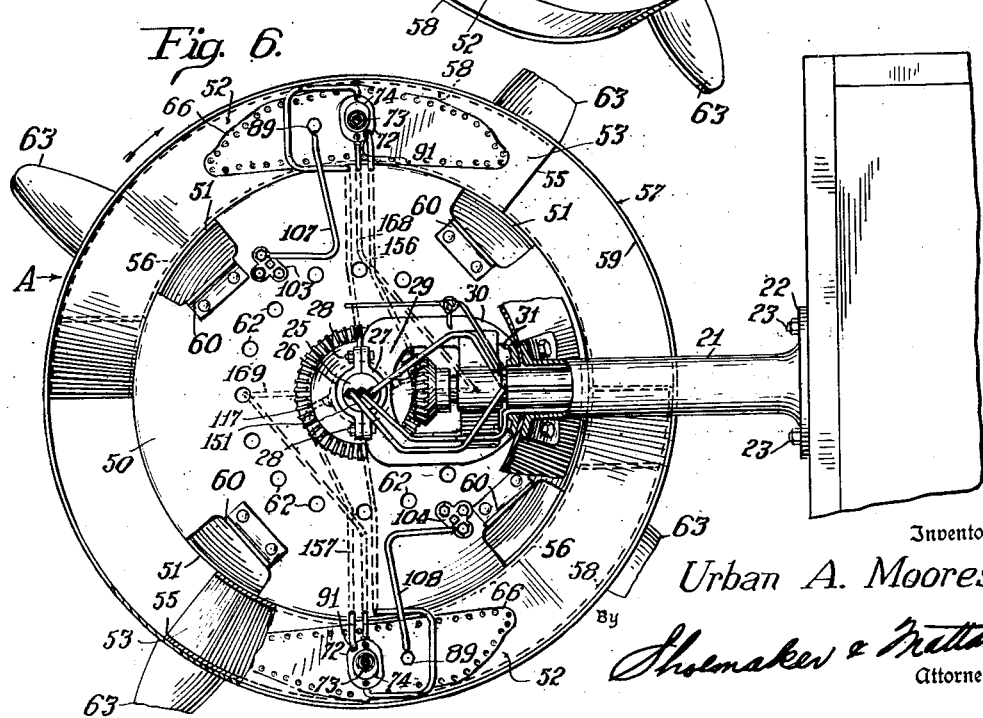
Fig. 6 is a front elevation of the rotor, only a fragment of the conical air deflector housing being shown in section.

The rim member 51 supports a plurality of tubular members 52, two being shown in the present instance, the tubular members being of general arcuate form, the same extending over about 130° of the rim 51 substantially concentric with the axis of rotation of the rotor A. As shown in Figs. 2 and 5, the tubular members 52 each of which constitutes a combined air scoop and combustion chamber, have intake portions 53 disposed parallel with the medial plane of the rotor A, and rearwardly curved restricted exhaust portions 54. 55 designates the air inlet opening at the end of each of the intake portions 53. The tubular members 52 which are of rectangular shape in cross section may be secured to the rim 51 in any suitable way. Preferably, as in the construction shown, the inner walls 56 of the exhaust portions 54 of the tubular members are secured to the rim 51 by welding. An outer rim 57 fits against and is secured by welding or in any other suitable way to the outer walls 58 of the tubular members 52, said outer rim having a lip portion 59 projecting forwardly beyond the front side of the intake portions 53 of the tubular members.

On the side plate 50 at the front side of the rotor at intervals thereabout are mounted tangentially disposed fins 60 which act to propel heated air toward the outer periphery of the tubular members 52 where it is trapped by the forwardly projecting lip portion 59. The outer rim 57 also has an annular portion 61 projecting rearwardly from the rear side of the tubular members 52, this rearwardly projecting portion overlapping the rearwardly curved exhaust portions 54 of the tubular members 52 and serving as additional supporting means therefor. 62 designates small breather openings through the side plates 50 at intervals thereabout and which provide for circulation of cool air through the side plates over the bearing assembly and the dissipation of heat therefrom. In the particular embodiment of the invention shown in the drawings, the rotor has propeller blades 63 mounted on the outer rim 57.

Figure 4:
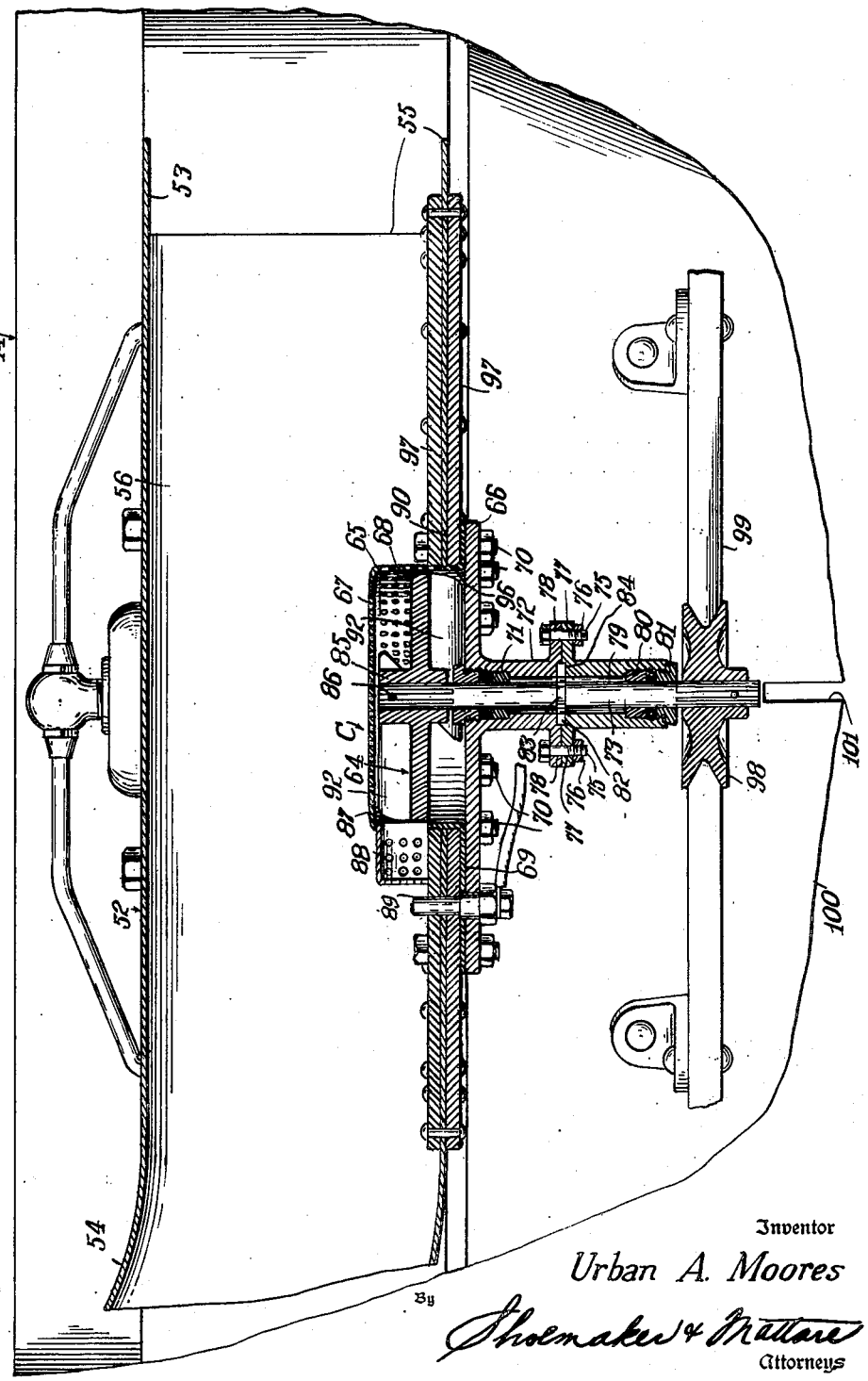
Fig. 4 is a detail sectional view on the line 4—4 of Fig. 1.

A rotary fuel atomizing device is provided for each of the combined air scoop and combustion chamber members 52. As shown in detail in Figs. 7, 8 and 4, the fuel atomizing device generally designated C is in the form of an axial flow pump comprising an impeller wheel 64 operating in a casing. The casing is formed by a cup-shaped member 65 and a front end plate member 66, the cup-shaped member 65 having an end wall 67 and an annular side wall 68 terminating in an annular outwardly extending lateral flange 69 fitting against the rear side face of the front end plate member 66 and secured thereto by bolts 70. The front plate member 66 is provided with a central opening 71 and a lateral tubular extension 72 to receive the shaft 73 of the impeller wheel 64. The tubular extension 72 has an outer section 74 formed separately therefrom and detachably connected thereto by bolts 75 and nuts 76, the bolts extending through apertures in flanges 77 and 78 on said parts. The interior diameter of the tubular extension 72 is larger than the diameter of the shaft 73 to provide an oil chamber 79 between the same and bearings 80 for the impeller shaft 73 suitably secured within the tubular extension 72. 81 are stuffing boxes at opposite ends of the tubular extension 72.

The impeller shaft 73 is held within the tubular extension 72 against longitudinal play by a split thrust ring 82 rotatably fitting in an annular groove 83 in the impeller shaft 73, said thrust ring at its outer part fitting in a recess 84 in the abutting end portions of the tubular extension 72 and its removable section 74. The hub 85 of the impeller wheel 64 is splined on the shaft 73 and is secured thereto against longitudinal movement by a transverse pin 86. The annular side wall 68 of the cup-shaped member 65 is perforated, and the end wall 67 is also perforated, as shown, except for a small area 87 adjoining the annular side wall at which point is suitably secured to the annular side wall 68 a small rectangular shaped casing 88 having perforated walls and constituting a shield for a pilot light, said shield projecting laterally from the annular side wall 68 adjacent the inner end of a spark plug 89 mounted on the front side wall 90 of the air scoop and combustion chamber member 52, the arrangement being such that some of the liquid fuel entering the atomizer casing under pressure through the inlet 91 in the front end plate member 66 will be trapped by the imperforate area 87 of the end wall 67 of the atomizer casing and forced in a spray through perforations in the annular side wall 68 into the pilot light shield 88 by the action of the impeller wheel blades 92. Liquid fuel will also be sprayed through the apertures in the annular side wall 68 and end wall 67 of the atomizer casing into intimate contact with air forced into the air scoop and combustion chamber members 52 by rotation of the rotor A of the turbine.

On the tubular extension 72 are nipples 93, 94, the nipple 93 leading into one end of the oil chamber 79 and the nipple 94 communicating with the outer end of an interior channel 95 in the tubular extension 72 leading from the opposite end of said interior channel.

The atomizer device is mounted in an opening 96 in the front side wall of the combined air scoop and combustion chamber member 52 and secured thereto by the bolts 70, the cup-shaped member 65 being disposed well within the combined air scoop and combustion chamber member 52 with the laterally projecting pilot light shield 88 positioned adjacent the inner end of the spark plug 89 mounted on the front side wall of the air scoop member 52. The front side wall of the combined air scoop and combustion chamber member is reinforced adjoining the opening 96 by plates 97, said plates each having an opening corresponding to the opening 96 in the front side wall of the air scoop to receive the annular side wall 68 of the atomizer casing, said plates being riveted, as shown, or otherwise suitably secured to the front wall of the air scoop member 52.

Fixed on the outer end portion of the impeller shaft 73 is a friction wheel 98 through which the impeller shaft is driven. The friction wheels 98 on the impeller shafts 73 of the atomizing device C frictionally engage a fiber race or friction ring 99 bolted on the outer face of a stationary conical housing 100, the friction gear wheels 98 being driven at high speed through their frictional engagement with the fiber race or friction ring 99.

The conical housing 100 which is located directly in front of the rotor A with its axis in alignment with the axis of rotation of the rotor, acts to direct air to the outer periphery of the combined air scoop and combustion chamber members 52 where it is trapped by the forwardly projecting lip portion 61 of the rotor A. The conical housing 100 which is constructed of sheet metal, is provided at intervals thereabout with slots 101 for the passage of cool air to the interior thereof and is also provided with a ventilating port 102 at its forward end. The conical housing 100 is supported by the main supporting member 21, said conical housing having an opening in the side wall thereof in alignment with the inner end of the main supporting member 21, and the wall portion of the conical housing 100 that borders said opening being interposed between the flange 31 of the portion 30 of the clamp member 27 and the flange 22 on the outer end of the main supporting member 21 and secured thereto by the bolts 23.

Suitably mounted on the side plates 50 at the front side of the rotor A are electrical contact members 103 and 104 adapted during rotation of the rotor A to contact with contact members 105 and 106 mounted on the stationary conical housing 100 at the inner side thereof to effect firing of the spark plugs 89 intermittently by making and breaking the electric circuit through the same, the contacts 103 and 104 on the rotor A being connected by electrical conductors 107 and 108 with the spark plugs, and the contacts 105 and 106 on the stationary conical housing 100 being electrically connected through a conductor 109 with one terminal of an ignition coil 110 mounted on the end panel 19 of the supporting housing.

For starting the rotor A, an automatic starting motor 111 of well known conventional construction is provided. Power is transmitted from the starting motor 111 to the rotor A to rotate the same through a shaft 112 having a gear 113 keyed thereto and meshing with a gear 114 on the drive shaft 115 of the motor 111, and the shaft 112 having a bevel pinion 116 fixed on the outer end thereof meshing with a bevel pinion 117 secured by bolts 118 to the flange 48 of the end head of the hub 33 of the rotor A. The power transmission shaft 112 which extends horizontally through the main tubular supporting member 21 is supported at its inner end portion by a bearing 119 mounted on the end wall 19 of the supporting frame, a bearing 120 on the front wall 18, and a bearing 121 on the portion 30 of the clamp member 27. A thrust yoke 122 on the outer end of an arm 123 bolted at its inner end to the front wall 18 of the supporting frame, engages in an annular recess 124 in a collar 125 fixed on the transmission shaft 112, holds said shaft against longitudinal movement. 126 designates a long light metal tube disposed within the main tubular supporting member 21 concentric to and in spaced relation with the same and the transmission shaft 112, said tube forming a casing about the transmission shaft 112 and providing with the inner wall of the main tubular supporting member an annular chamber 127 for conduits for fuel and lubricant, and also electric conductors hereinafter referred to. The tube or casing 126 is provided at its inner end with an annular attaching flange 128 which is interposed between the flange 22 and the front wall 18 of the supporting housing and secured thereto by the bolts 23. The flange 128 of the casing 126 is provided at intervals thereabout with openings for the passage of the fuel and oil conduits referred to through the flange.

Electric current is supplied to the motor 111 from a storage battery 129 mounted on the front wall 18 of the supporting frame through an electric conductor 130, one terminal of the storage battery 129 and one terminal of the motor 111 being grounded. Interposed in the electric conductor 130 is a starter switch 131 of conventional form. An electric generator 132 suitably mounted on the end wall of the supporting housing is driven by the starting motor 111, the latter having a gear 133 on one end of its shaft 134 meshing with the gear 113 on the transmission shaft 112, the generator supplying current to ignition coil 110. 136 designates a knife blade switch mounted on the end panel 19 having end contacts 137 and 138, and an intermediate contact 139 to which the switch blade 140 is pivoted. One terminal of the ignition coil 110 is connected by a conductor 141 to the contact 137 of the switch. The contact 139 of the switch is connected by a conductor wire 142 to one terminal of the generator 132, the other end contact 138 of the switch being connected by a conductor wire 143 to the contact 144 of the starter switch 131. When the switch blade 140 is in the position illustrated in Fig. 1 of the drawings connecting the contacts 137 and 139, current will be supplied from the generator 132 to the ignition coil 110.

When the liquid fuel sprayed into the combined combustion and air scoop members 52 into intimate contact with the air forced into the air scoop members by rotation of the rotor A by the starting motor 111 has become fully ignited and the propulsive action of the exhaust of the combined chamber and air scoop members is sufficiently great to rotate the rotor A at a speed greater than that at which the same is rotated by the starting motor 111, the latter automatically disengages itself, the rotor A being then propelled solely by the high velocity exhausts of the combined combustion chamber and air scoop members 52 of the rotor. As soon as the rotor A is functioning in this way, the switch blade 140 is swung to disengage the same from the contact 137 and to connect the contact 138 with contact 139, the current from the generator 132 being thereby shunted from the ignition coil 110 to the storage battery 129 to charge the same, the storage battery in this way being kept fully charged.

Liquid fuel is continuously supplied under pressure to the inlets 91 of the atomizer devices C from the fuel tank 145. The fuel tank is of a size to provide space therein for compressed air over the surface of the fuel contained in the tank sufficient to force the fuel through the fuel lines leading to the inlets 91 of the atomizers C. Sufficient air pressure is maintained in the tank 145 by a centrifugal air pump 146. The rotary piston of the pump 146 is fixed on a horizontally extending shaft 147 on which is a drive pully 148 that is connected by a belt 149 with a pulley 150 on the transmission shaft 112. The liquid fuel is lead from the tank 145 by a pipe 151 extending from the interior of the tank near the bottom thereof through the main supporting tubular member 21 to the inner end of an interior longitudinal channel 152 in the shaft 25, extending from the inner end of the shaft to an annular chamber 153 that is formed by an annular recess in the inner wall of the end head member 44 at the inner end of the hub 33. Interior channels 154 and 155 extend outwardly from the annular chamber 153 through the wall of the end head member 44 and the flange 35 of the hub 33. 155ᵃ and 155ᵇ designate packing glands at opposite ends of the end head member 44. Pipes 156 and 157 lead outwardly from the outer ends of the channels 154 and 155 to the fuel inlets 91 of the atomizer devices C. Interposed in the liquid fuel conducting pipe 151 is a control valve 158. A constant flow of liquid fuel to the atomizer devices C is assured. The air pump 146 creates a slight pressure of air on the fuel in the tank 145, thereby forcing the liquid fuel from the tank into the fuel conducting pipes. In conjunction with this pressure feed, the rotary atomizer devices each act as a suction pump, and the centrifugal action of the combined combustion chambers and air scoop members 52 pulls the liquid fuel toward the outer periphery of the same. These three separate forces acting in conjunction with each other insure a constant flow of liquid fuel to the combined air scoop and combustion chambers 52, the feeding of the liquid fuel being positive and direct and not dependent on heat, carburation or other secondary devices.

Figure 3:
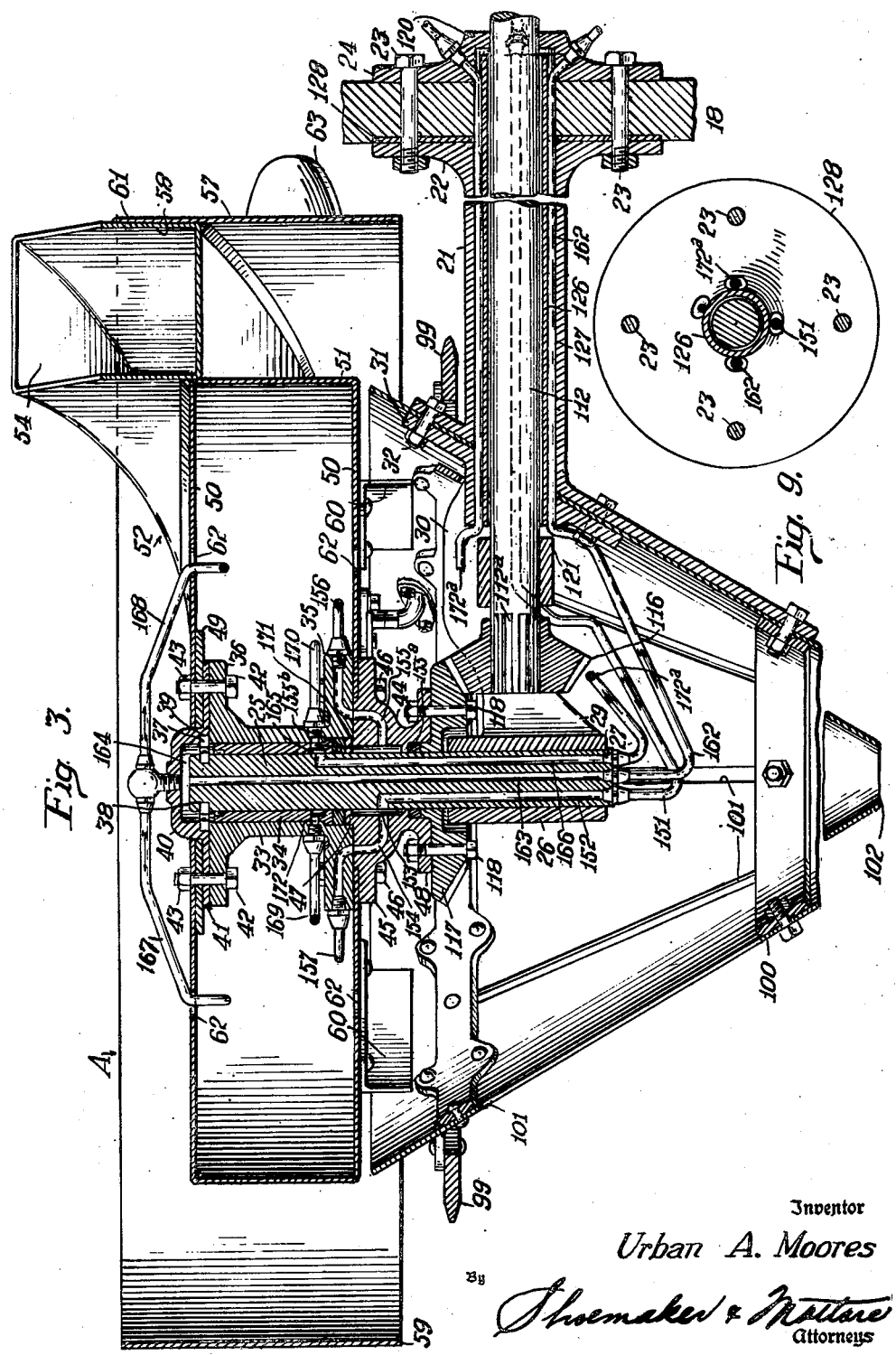
Fig. 3 is a horizontal section on the line 3—3 of Fig. 1.

A lubricating system is provided for the bearings of the rotor A and the impeller wheels 64 of the atomizing devices C. Referring particularly to Figs. 1, 2 and 3 of the drawings, the lubricating system includes a centrifugal pump 159 mounted on the shaft 147 that is driven from the transmission shaft 112. To the inlet of the oil pump 159 is connected a pipe 160 leading from an oil tank 161, and said pump forces the oil through a conduit 162 extending through the main tubular member 21 to the inner end of an interior channel 163 in the shaft 25 that extends longitudinally therethrough centrally thereof and connects with a chamber 164 adjoining the outer end of the bearing sleeve 34 in the end cap member 40 of the hub 33. Some of the lubricating oil entering the chamber 164 works between the bearing sleeve 34 and the shaft 25 and passes rearwardly to an annular chamber 165 in the inner wall of the bearing sleeve 34 near the inner end thereof. From the annular chamber 165 in the bearing sleeve 34, the oil enters the inner end of an interior channel 166 in the shaft 25 leading back through said shaft to the inner end thereof. Conduits 167 and 168 lead from the chamber 164 in the end cap member 40 of the hub 33 to the oil inlet nipples 93 of the atomizer devices C, oil being forced from the chamber 164 through the conduits 167 and 168 to the oil chamber 79 in the tubular extension 72 of each of the atomizer devices C to the outlet nipples 94 thereof and from thence through pipes 169 and 170 to short channels 171 and 172 extending through the side wall of the hub 33 to the annular chamber 165 in the bearing sleeve 34.

A return conduit 172ᵃ connected with the inner end of the interior channel 166 in the shaft 25 leads to an oil filter 173. From the oil filter, the oil passes to a cooling radiator 174 and from thence the filtered cooled oil is returned to the tank for recirculation through the system. 175 designates a fan mounted on the shaft 147 forcing cool air through the radiator 174.

In the operation of the rotor, air is forced into the combined air scoop and combustion chamber members 52 by rotation of the rotor, into intimate contact with liquid fuel sprayed by the rotary atomizer devices into the air scoop and combustion chamber members, and the mixture ignited, the resulting highly compressed gases within the tubular members issuing from the exhausts thereof in a continuous high velocity jet. The special construction of rotor with the curved air scoop and combustion chamber members disposed substantially concentric with the axis of rotation of the rotor, coupled with the spraying of the liquid fuel into the combustion chamber members by the rotary atomizer devices, results in a highly efficient power plant. In the particular embodiment of the invention illustrated in the drawings, that is particularly adapted for use as an airplane power plant, the exhaust portions of the air scoop and combustion chamber members are so disposed that the high velocity jets issuing therefrom are directed to cause rotation of the rotor and also at the same time produce a forward axial thrust thereon.

The transmission shaft 112 at its inner end portion 112ᵃ is splined as shown to provide for mounting thereon a power take-off pulley (not shown) when the power device is used as a stationary power plant. When employed as a stationary power plant, the offset curve of the exhaust portions 54 is adjusted to the smallest possible angle relatively to the medial plane of the rotor so that the exhaust portions of one air scoop and combustion chamber member just clears the air inlet of the other air scoop and combustion chamber member, this arrangement insuring the greatest peripheral speed and efficiency. As will be understood when the power device is employed as a stationary power plant, the propeller blades 63 shown on the outer rim 57 of the rotor, are dispensed with.

What I claim is:

1. A rotary ram jet motor including a rotor, a plurality of generally arcuate shaped tubular members on the rotor extending about peripheral portions thereof substantially concentric with the axis of rotation of the rotor and spaced circumferentially from each other, each of said tubular members including a main portion extending throughout an arc of at least 30 degrees disposed substantially parallel with the medial plane of the rotor, said tubular members each forming an air scoop and a combustion chamber, the members each being open at their ends and having an air intake portion disposed in a plane parallel with the medial plane of the rotor and a rearwardly curved exhaust portion offset from the medial plane of the rotor, the exhausts of said members exerting a propulsive force upon the rotor, means for introducing liquid fuel into the tubular members and means for igniting fuel mixture within said members.

2. A rotary ram jet motor including a rotor, a plurality of generally arcuate shaped tubular members on the rotor extending about peripheral portions thereof substantially concentric with the axis of rotation of the rotor and spaced circumferentially from each other, each of said tubular members including a main portion extending throughout an arc of at least 30 degrees substantially parallel with the medial plane of the rotor, said tubular members each forming an air scoop and a combustion chamber, said members being open at their ends for the entrance of air at one end and for discharge at the other end, the exhausts of said tubular members exerting a propulsive force upon the rotor, means for introducing liquid fuel into said tubular members, means for igniting fuel mixture within the tubular members, and a conical housing disposed at the front side of the rotor with its axis in alignment with the axis of rotation of the rotor and with its apex portion facing forwardly and its larger end located adjacent the front side of said tubular members inwardly of the outer periphery thereof, said conical housing acting to direct air toward said tubular members.

3. A rotary ram jet motor including a rotor, a plurality of generally arcuate shaped tubular members on the rotor extending about peripheral portions thereof substantially concentric with the axis of rotation of the rotor and spaced circumferentially from each other, the tubular members each forming an air scoop and a combustion chamber, said members being open at their ends for the entrance of air at one end and for discharge at the other end, the exhausts of the tubular members exerting a propelling force upon the rotor, means for introducing liquid fuel into the tubular members including a fuel atomizing device mounted on each of the tubular members comprising a casing having a foraminous wall portion, the orifices of said foraminous wall portion opening into the interior of the tubular member, and a rotary pump or impeller wheel in said casing, means for rotating the rotary pump or impeller members, the casing having a fuel inlet, and means for igniting fuel mixture within the tubular members.

4. A rotary ram jet motor including a rotor, a plurality of generally arcuate shaped tubular members on the rotor extending about peripheral portions thereof substantially concentric with the axis of rotation of the same and spaced circumferentially from each other, the tubular members each forming an air scoop and a combustion chamber, the members being open at their ends for the entrance of air at one end and for discharge at the other end, the exhausts of the tubular members exerting a propulsive force upon the rotor, means for introducing liquid fuel into the tubular members including a fuel atomizing device mounted on each tubular member comprising a casing having a part thereof projecting into the tubular member and having a foraminous wall portion, a rotary pump or impeller wheel in the casing, and means for rotating the pump or impeller wheels, the casing having a fuel inlet, and means for igniting fuel mixture within the tubular members.

5. A rotary ram jet motor including a rotor, a plurality of generally arcuate shaped tubular members on the rotor extending about peripheral portions thereof substantially concentric with the axis of rotation of the rotor and spaced circumferentially from each other, said tubular members each forming an air scoop and a combustion chamber, said members being open at their ends for the entrance of air at one end and for discharge at the other end, the exhausts of said tubular members exerting a propulsive force upon the rotor, means for introducing liquid fuel into said tubular members, including a fuel atomizing device for each of the same comprising a casing mounted on a side wall of the tubular member and in communication with the interior thereof, a shaft mounted for rotation on said casing and projecting laterally therefrom to one side of the tubular member, a rotary pump or impeller wheel within said casing mounted on said shaft, a friction gear wheel on the end portion of the shaft that extends to one side of the tubular member and a stationary gear member disposed at one side of the rotor and having an annular friction portion, said annular friction portion of the stationary gear member being in frictional engagement with the friction gear wheels of the atomizer devices and rotating the same when the rotor is rotated, and means for igniting fuel mixture within the tubular members.

6. A rotary ram jet motor including a rotor, a plurality of generally arcuate shaped tubular members on the rotor extending about peripheral portions thereof substantially concentric with the axis of rotation of the rotor and spaced circumferentially from each other, said tubular members each forming an air scoop and a combustion chamber, said members being open at their ends for the entrance of air at one end and for discharge at the other end, the exhausts of said tubular members exerting a propulsive force upon the rotor, means for introducing liquid fuel into said tubular members, including a fuel atomizing device for each of the tubular members comprising a casing mounted in an opening in a wall of the tubular member and having a cylindrical part projecting within the tubular member, said cylindrical part having foraminous wall portions, a rotary pump or impeller wheel in said casing and means for rotating the pump or impeller wheels, said casing having a fuel inlet, and means for igniting fuel mixture within the tubular members.

7. A rotary ram jet motor including a rotor, a plurality of generally arcuate shaped tubular members on the rotor extending about peripheral portions thereof substantially concentric with the axis of rotation of the rotor and spaced circumferentially from each other, said tubular members each forming an air scoop and a combustion chamber, said members being open at their ends for the entrance of air at one end and for discharge at the other end, the exhausts of said tubular members exerting a propulsive force upon the rotor, means for introducing liquid fuel into said tubular members, including a fuel atomizing device for each of the tubular members comprising a casing mounted in an opening in a wall of the tubular member and having a cylindrical part projecting within the tubular member, said cylindrical part having foraminous wall portions, a rotary pump or impeller wheel in said casing and means for rotating the pump or impeller wheels, said casing having a fuel inlet, a tubular pilot light shield projecting from the side wall of the cylindrical part of said casing and in communication with the interior thereof, said pilot light shield having foraminous walls, and means for igniting a fuel mixture in the tubular member including a spark plug mounted on the side wall of the tubular member with its inner end disposed adjacent the pilot light shield.

8. A rotary ram jet motor including a rotor, a plurality of generally arcuate shaped tubular members on the rotor extending about peripheral portions thereof substantially concentric with the axis of rotation of the rotor and spaced circumferentially from each other, said tubular members each forming an air scoop and a combustion chamber, said members being open at their ends for the entrance of air at one end and for discharge at the other end, the exhausts of said tubular members exerting a propulsive force upon the rotor, means for introducing liquid fuel into said tubular members, including a fuel atomizing device for each of the tubular members comprising a casing mounted in an opening in a wall of the tubular member and having a cylindrical part projecting within the tubular member, said cylindrical part having foraminous wall portions, a rotary pump or impeller wheel in said casing and means for rotating the pump or impeller wheels, said casing having a fuel inlet, a tubular pilot light shield projecting from the side wall of the cylindrical part of said casing and in communication with the interior thereof, said pilot light shield having foraminous walls, the side wall of said cylindrical part of the casing being perforated and the back wall of the cylindrical part of the casing being perforated except for a small portion adjacent the point of location of the inner end of the pilot light shield, said imperforate portion acting to trap and direct some of the liquid fuel entering said casing into the pilot light shield, the casing having a fuel inlet, and means for igniting fuel mixture in the tubular member including a spark plug mounted on the side wall of the tubular member with its inner end disposed adjacent the pilot light shield.

9. A rotary ram jet motor including a housing, an elongated tubular supporting member secured at its inner end to and projecting horizontally from a side wall of the housing, a stationary shaft supported by and extending at a right angle to the tubular supporting member from the outer end thereof, said shaft being fixedly secured at its inner end to the outer end of the tubular supporting member, the tubular supporting member constituting the sole support for said last mentioned shaft, a rotor mounted for rotation on said shaft, a horizontal shaft supported for rotation on the housing extending through said wall of the housing and the tubular supporting member, a gear connection between the outer end of said last mentioned shaft and the rotor, a plurality of generally arcuate shaped tubular members on the rotor extending about peripheral portions thereof, the tubular members each forming an air scoop and a combustion chamber, said members being open at their ends for the entrance of air at one end and for discharge at the other end, the exhausts of the tubular members exerting a propulsive force upon the rotor, means for introducing liquid fuel into the tubular members, means for igniting fuel mixture within said members, and an electric starting motor within the housing operatively connected to said rotary shaft.

10. A rotary ram jet motor including a housing, an elongated tubular supporting member secured at its inner end to and projecting horizontally from the side wall of the housing, a stationary shaft supported by and extending at a right angle to said supporting member from the outer end thereof, said shaft being fixedly secured at its inner end to the outer end of the supporting member, the tubular supporting member constituting the sole support for said last mentioned shaft, a rotor mounted for rotation on said shaft, a horizontal shaft supported for rotation on the housing extending through said wall of the housing and said tubular member, a gear connection between the outer end of said last mentioned shaft and the rotor, a plurality of generally arcuate shaped tubular members on the rotor extending about peripheral portions thereof substantially concentric to the axis of rotation of the rotor and spaced circumferentially from each other, the tubular members each forming an air scoop and a combustion chamber, the members being open at their ends for the entrance of air at one end and for discharge at the other end, the exhausts of the tubular members exerting a propulsive force on the rotor, means for introducing liquid fuel into said tubular members, means for igniting fuel mixture within said members, and a conical housing supported on the elongated supporting member at the front side of the rotor with its axis in alignment with the axis of rotation of the rotor and with its apex portion facing forwardly and its larger end located adjacent the front side of the tubular members near the inner peripheral walls of said tubular members, said conical housing enclosing the inner end portions of said shafts.

11. The construction defined in claim 10 and in which the conical housing has an air inlet port in the forward end thereof and longitudinally extending air inlet openings therein at intervals thereabout intermediate the ends thereof, said air inlet port and said longitudinally extending air inlet openings providing for passage of air from the front side of the conical housing to the interior thereof about said inner end portions of said shafts and said gear connection.

12. A rotary ram jet motor including a support, an elongated supporting member projecting horizontally from the support, a shaft supported by and extending at a right angle to said supporting member from the outer end thereof, said shaft being fixedly secured at its inner end to the outer end of said supporting member, a rotor mounted for rotation on said shaft, a plurality of generally arcuate shaped tubular members on the rotor extending about peripheral portions thereof substantially concentric to the axis of rotation of the rotor and spaced circumferentially from each other, said tubular members each forming an air scoop and a combustion chamber, the members being open at their ends for the entrance of air at one end and for discharge at the other end, means for introducing liquid fuel into the tubular members including a fuel atomizing device for each of the same comprising a casing mounted on a wall of the tubular member and in communication with the interior of the same, a shaft mounted for rotation on said casing and projecting laterally therefrom to one side of the tubular member, a rotary pump within said casing mounted on said last mentioned shaft, a friction drive wheel on the end portion of the shaft that extends to one side of the tubular member, a conical housing supported on said supporting member at the front side of the rotor with its axis in alignment with the axis of rotation of the rotor and with its apex portion facing forwardly and its larger end located adjacent the front side of the rotor inwardly of the outer periphery of the tubular members, a friction ring gear fixedly mounted on the conical housing at one side of the rotor, said friction ring gear being in frictional engagement with the friction gear wheels of the atomizing devices and rotating the same when the rotor is rotated, and means for igniting fuel mixture within said tubular members.

13. The construction defined in claim 12 and in which the means for igniting fuel mixture within the tubular members includes spark plugs mounted on the tubular members, contact members on the rotor electrically connected with the spark plugs, and contact members on said conical housing contacting with the contact members on the rotor during rotation thereof to make and break an electrical circuit through the spark plugs.

14. A rotary ram jet motor including a rotor, a plurality of generally arcuate shaped tubular members on the rotor extending about peripheral portions thereof substantially concentric with the axis of rotation of the rotor and spaced circumferentially from each other, the tubular members each forming an air scoop and a combustion chamber, the tubular members being open at their ends for the entrance of air at one end and discharge at the other end, means for introducing liquid fuel into the tubular members including a fuel atomizing device for each of the same comprising a casing mounted on a wall of the tubular member and in communication with the interior thereof, said casing having a fuel inlet, a rotary impeller wheel within the casing, means for rotating the impeller wheels, a liquid fuel tank, a fuel conducting pipe connected with the fuel inlet of the casing of the atomizer device of each of the tubular members, a main fuel conducting conduit leading from the interior of the fuel tank near the bottom thereof, said main fuel conducting conduit communicating with each of said first mentioned fuel conducting pipes, and a centrifugal pump for maintaining air pressure in the fuel tank to force fuel from the fuel tank into said main fuel conducting conduit and into said first mentioned conducting pipes, and means for igniting fuel mixture within the tubular members.

15. A rotary ram jet motor including a support, a shaft supported at one end on the support, a rotor having a central hub mounted for rotation on said shaft, a plurality of generally arcuate shaped tubular members on the rotor extending about peripheral portions thereof substantially concentric with the axis of rotation of the rotor and spaced circumferentially from each other, said tubular members each forming an air scoop and a combustion chamber, said members being open at their ends for entrance of air at one end and for discharge at the other end, means for introducing liquid fuel into said tubular members including a liquid fuel inlet in the side wall of each of the tubular members, an annular chamber in the inner wall of the hub of the rotor, two interior channels in the hub extending outwardly from said annular chamber to the outer face of the hub, fuel conducting pipes extending from the outer ends of said interior channels to the fuel inlets in the side walls of the tubular members, an interior longitudinal channel in said shaft extending from one end thereof to said annular chamber in the hub of the rotor, a fuel tank, a fuel conduit leading from the fuel tank to the inner end of the interior longitudinal channel in the shaft, means for forcing liquid fuel from the tank through said fuel conduit and fuel conducting pipes, and means for igniting fuel mixture in the tubular members.

16. A rotary ram jet motor including a support, a shaft supported at one end on the support, a rotor having a central hub mounted for rotation on said shaft, a plurality of generally arcuate shaped tubular members on the rotor extending about peripheral portions thereof substantially concentric with the axis of rotation of the rotor and spaced circumferentially from each other, said tubular members each forming an air scoop and a combustion chamber, said members being open at their ends for entrance of air at one end and for discharge at the other end, means for introducing liquid fuel into said tubular members including a fuel atomizing device for each of the tubular members comprising a casing mounted on the wall of the tubular member and in communication with the interior thereof, means for conducting liquid fuel to said casing, a tubular bearing on said casing, a shaft rotatably mounted in said tubular bearing, an impeller wheel within the casing fixed on said shaft, and means for conducting lubricating oil to the bearing of the rotor hub and to the bearing of the shaft of the impeller wheel including a chamber in the outer end of the hub, an interior channel in the shaft extending centrally thereof from the inner end of the same to the chamber in the outer end of the hub, an annular chamber in the inner wall of the bearing sleeve in the interior of the hub, an interior longitudinal channel in the shaft leading from said annular chamber in said sleeve bearing to the inner end of the shaft, conducting pipes leading from the chamber in the outer end of the hub to one end of the bearings of the impeller shafts of the atomizing devices, conduit pipes leading from the other end of said last mentioned bearing to said annular chamber in said bearing sleeve, an oil tank, a conduit leading from the tank to the inner end of the central longitudinal interior channel in the shaft, a return conduit leading from the outer end of the second mentioned longitudinal interior channel in the shaft back to the oil tank, an oil filter interposed in said last mentioned return conduit, and a centrifugal pump interposed in the first mentioned conduit for circulating oil from the tank through the said conduits and channels in the shaft back to the tank.

17. A rotary ram jet motor including a rotor, a plurality of generally arcuate shaped tubular members on the rotor extending about peripheral portions thereof substantially concentric with the axis of rotation of the rotor and spaced circumferentially from each other, each of said tubular members including a main portion extending through an arc of at least 30 degrees substantially parallel with the medial plane of the rotor, said tubular members each forming an air scoop and a combustion chamber, said members being open at the ends thereof for the entrance of air at one end and for discharge at the other end, the exhausts of said tubular members exerting a propulsive force upon the rotor, means for introducing liquid fuel into said tubular members, means for igniting fuel mixture within the tubular members, and said rotor having an annular lip portion projecting forwardly from the outer peripheral walls of the tubular members.

18. A rotary ram jet motor including a rotor, a plurality of generally arcuate shaped tubular members on the rotor extending about peripheral portions thereof substantially concentric with the axis of rotation of the rotor and spaced circumferentially from each other, said tubular members each forming an air scoop and a combustion chamber, said members being open at their ends for the entrance of air at one end and for discharge at the other end, the exhausts of said tubular members exerting a propulsive force upon the rotor, means for introducing liquid fuel into said tubular members, means for igniting fuel mixture within the tubular members, a conical housing disposed at the front side of the rotor with its axis in alignment with the axis of rotation of the rotor and with its apex portion facing forwardly and its larger end located adjacent the front side of said tubular members inwardly of the outer periphery thereof, said conical housing acting to direct air toward said tubular members, and said rotor having an annular lip portion projecting forwardly from the outer peripheral walls of the tubular members.

19. A rotary ram jet motor including a rotor, a plurality of generally arcuate shaped tubular members on the rotor extending about peripheral portions thereof substantially concentric with the axis of rotation of the rotor and spaced circumferentially from each other, said tubular members each forming an air scoop and a combustion chamber, said members being open at their ends for the entrance of air at one end and for discharge at the other end, the exhausts of said tubular members exerting a propulsive force upon the rotor, means for introducing liquid fuel into said tubular members, and means for igniting fuel mixture within the tubular members, said rotor having an annular lip portion projecting forwardly from the outer peripheral walls of the tubular members, and having fins thereon at the front side thereof inwardly of said tubular members for directing air outwardly toward the same.

20. A rotary ram jet motor of the construction defined in claim 9 and in which the rotor has radially extending peripheral propeller blades located thereon outwardly of said tubular members.

21. A rotary ram jet motor of the construction set forth in claim 10, and in which the conical housing has an air inlet port in the wall thereof providing for the passage of air from the front side of the conical housing to the interior thereof about said inner end portions of said shafts and said gear connection.

22. A rotary ram jet motor including a rotor comprising a hub part, a circular rim member concentric with the hub part, means between the hub and said rim rigidly connecting the same, a plurality of generally arcuate shaped tubular members of substantial length and of general rectangular shape in cross section on said rim member extending concentrically therewith and spaced circumferentially from each other, the curvature of the outer face of the inner wall of each of said tubular members corresponding to the curvature of the outer face of said rim and fitting against and being secured to the same, an outer rim member disposed in spaced concentric relation to said first mentioned rim encircling said tubular members, said outer rim member fitting against and being secured to the outer peripheral wall of each of said tubular members, the tubular members each forming an air scoop and a combustion chamber and being open at its ends for the entrance of air at one end and for discharge at the other end, the exhausts of the tubular members exerting a propulsive force upon the rotor, means for introducing liquid fuel into the tubular members, and means for igniting fuel mixture within the tubular members .

23. A rotary ram jet motor of the construction defined in claim 22 and in which the rotor has peripheral propeller blades fixedly secured at their inner ends on said outer rim and projecting radially outwardly therefrom.

URBAN A. MOORES.

REFERENCES CITED

The following references are of record in the file of this patent:

UNITED STATES PATENTS

| Number | Name | Date |
|---|---|---|
| 2,305,768 | Gente | Dec. 22, 1942 |
| 2,418,967 | Clark | Apr. 15, 1947 |
| 2,465,856 | Emigh | Mar. 29, 1949 |
| 2,499,863 | Hart | Mar. 7, 1950 |
| 2,544,420 | Goddard | Mar. 6, 1951 |
| 2,551,111 | Goddard | May 1, 1951 |
| 2,592,938 | McNaught | Apr. 15, 1952 |
| 2,603,947 | Howard | July 22, 1952 |